(12) United States Patent
Martone et al.

(10) Patent No.: US 8,478,802 B2
(45) Date of Patent: Jul. 2, 2013

(54) ORGANIZATION SYSTEM FOR DISTRIBUTED ITEMS

(75) Inventors: Peter Francis Martone, Seattle, WA (US); Gaurav Dhawan, Redmond, WA (US); David James, Snohomish, WA (US); Jeff Liu, Bellevue, WA (US); Richard Xia, Bothell, WA (US); Jun Wang, Bellevue, WA (US); Joshua Pointer, Washington, WA (US); Sobia Tariq, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/870,805

(22) Filed: Oct. 11, 2007

(65) Prior Publication Data

US 2009/0100057 A1    Apr. 16, 2009

(51) Int. Cl.
    *G06F 17/30* (2006.01)
(52) U.S. Cl.
    USPC .......................................................... 707/831
(58) Field of Classification Search
    None
    See application file for complete search history.

(56) References Cited

U.S. PATENT DOCUMENTS

| | | | |
|---|---|---|---|
| 5,812,773 A | 9/1998 | Norin | |
| 5,832,487 A * | 11/1998 | Olds et al. | 707/10 |
| 6,167,405 A | 12/2000 | Rosensteel, Jr. et al. | |
| 6,356,915 B1 * | 3/2002 | Chtchetkine et al. | 707/823 |
| 6,418,426 B1 | 7/2002 | Schlesinger | |
| 6,484,177 B1 * | 11/2002 | Van Huben et al. | 707/10 |
| 6,983,293 B2 | 1/2006 | Wang | |
| 7,430,570 B1 * | 9/2008 | Srinivasan et al. | 1/1 |
| 7,620,618 B2 * | 11/2009 | Tsukamoto | 1/1 |
| 2002/0178249 A1 | 11/2002 | Prabakaran et al. | |
| 2004/0133629 A1 * | 7/2004 | Reynolds et al. | 709/202 |
| 2005/0027748 A1 | 2/2005 | Kisley | |
| 2005/0159969 A1 * | 7/2005 | Sheppard | 705/1 |
| 2005/0223024 A1 * | 10/2005 | Hyun et al. | 707/102 |
| 2006/0020586 A1 * | 1/2006 | Prompt et al. | 707/3 |
| 2006/0101452 A1 | 5/2006 | Mak | |
| 2006/0282440 A1 * | 12/2006 | Fletcher et al. | 707/100 |
| 2007/0136389 A1 | 6/2007 | Bergant et al. | |
| 2007/0156791 A1 | 7/2007 | Everhart | |
| 2008/0077562 A1 * | 3/2008 | Schleppe | 707/3 |
| 2008/0281788 A1 * | 11/2008 | Frieder et al. | 707/3 |

OTHER PUBLICATIONS

"Access amid complexity: Transferring data between enterprise applications", Electronic Data Systems Corporation, 2004, pp. 6.
Joao, et al., "A Flexible Object-Group-Oriented Framework to support Large Scale Collaborative Applications", pp. 10.
Lamehamedi, et al., "Simulation of Dynamic Data Replication Strategies in Data Grids", Proceedings of 12th Heterogeneous Computing Workshop, pp. 10.

* cited by examiner

*Primary Examiner* — Neveen Abel Jalil
*Assistant Examiner* — Kevin L Young
(74) *Attorney, Agent, or Firm* — Michael B Dodd; Dodd Law Group

(57) ABSTRACT

An item grouping mechanism may be applied to files or other computer objects to allow the files or objects to be accessed according to the group definition. The group definition may be defined in a table with other group definitions and distributed across an organization so that each device using the group definition may have files or other items presented in a consistent manner. The group definition may be distributed through a different mechanism than for the files or other items. If a device determines that a file defined in the group definition is missing from a local store, the device may retrieve the file from a distribution server.

17 Claims, 4 Drawing Sheets

200
HIERARCHICAL
NETWORK WITH GROUP
DEFINITIONS

ORGANIZATION SYSTEM FOR DISTRIBUTED ITEMS

BACKGROUND

File organization systems often include directory structures, permission settings, and other variables that define how a set of files or other groupings of data may be presented and accessed. When a set of files are distributed over a large organization, various groups within the organization may organize the files or other items in a manner specially adapted for the local purposes.

In a hierarchical organization such as a company with several geographically dispersed divisions, some directives may be issued at a company level, while other directives may be at a divisional or departmental level. With each directive, a reference may be made to specific files or groups of data. Such references may assume that a certain file grouping exists. Thus, there may be a conflict between having items organized in a consistent manner and organizing items useful at a local level.

SUMMARY

An item grouping mechanism may be applied to files or other computer objects to allow the files or objects to be accessed according to the group definition. The group definition may be defined in a table with other group definitions and distributed across an organization so that each device using the group definition may have files or other items presented in a consistent manner. The group definition may be distributed through a different mechanism than for the files or other items. If a device determines that a file defined in the group definition is missing from a local store, the device may retrieve the file from a distribution server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
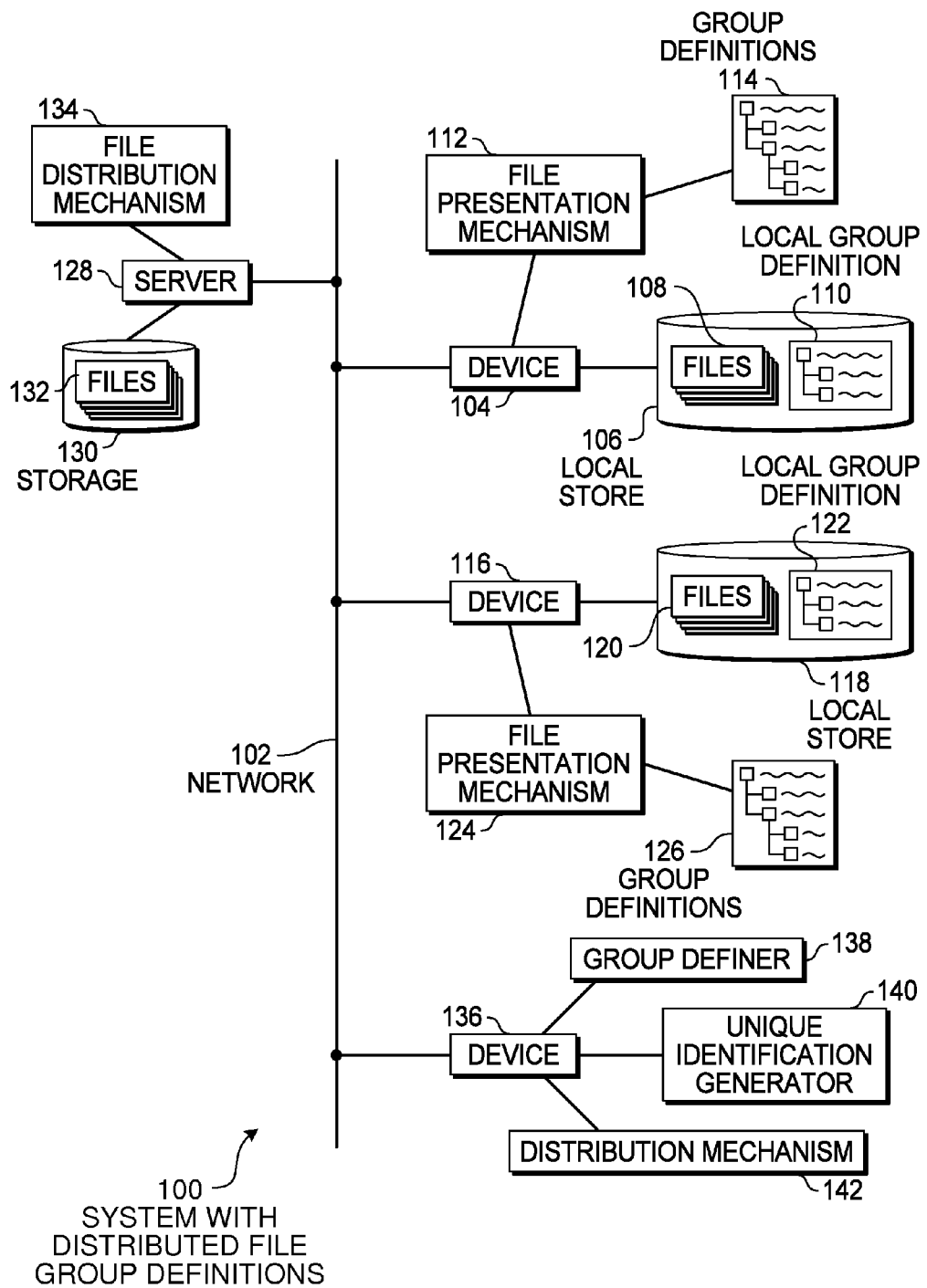
FIG. 1 is a diagram illustration of an embodiment showing a system with distributed file group definitions.

A consistent grouping of files or other items may be distributed across several devices. A presentation mechanism may enable the files or items to be viewed in any predefined grouping, including groupings derived from a grouping table that may be distributed across a network to the various devices.

The grouping of files or other items may be created with a unique identification so that each grouping may be specifically identified, even if a local grouping uses the same or similar common name.

The grouping mechanism may enable a large distribution of a common set of files or other items and may also enable a consistent organization of the files to be enforced. The organization of the files may be used to consistently define a location for the files or items in any device that use the grouping definition. Even though the organization is applied consistently across a large number of devices, other groupings or organizations may also be used simultaneously.

In one use scenario, a large enterprise wide application may be used in a company with many different geographical divisions that may have departments or functional groups within the divisions or that may span divisions. An example of such an application may be an information technologies management system that may distribute software, data, and other information to various devices and systems. Because the files and other items may be used in different manners by different divisions or departments within the company, each division or department may organize the items in different manners. However, a directive that may be implemented on a company-wide level may refer to files or items organized in a particular fashion. In the use scenario, each department and division may define independent groupings of the files or items, but may also keep a company-wide grouping.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that has a distributed file group definition. Embodiment 100 is an example of a system that may use a file group definition across multiple devices, and may use different mechanisms for obtaining the group definitions and the files that are grouped.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The network 102 has several devices attached. In some embodiments, the network 102 may be a local area network or a wide area network of various architectures. In some cases, devices may be attached to the network 102 through hard-wired or wireless connections, through various gateways, routers, switches, or other network components. Some embodiments may connect to one or more devices through the Internet.

The device 104 may be connected to the network 102 and may have a local store 106. The device 104 may be any type of network connected device that has a storage system. In many embodiments, the device 104 may be a server computer or a personal computer, while in other embodiments the device 104 may be a handheld personal digital assistant, a cellular telephone, a mobile device with a bar code reader, for example, or any other network connected device that has a storage device.

The local store 106 may be a hard disk or other storage medium such as a solid state memory device that is locally attached. In some embodiments, the local store 106 may be located separately from the device 104 but may be controlled by the device 104. For example, a device 104 may access a local store 106 that is located on a server on a local area network, or may access a local store 106 that is connected over the Internet. The local store 106 may function as a storage device attached to or controlled by the device 104, regardless of the attachment mechanism or physical distance between the device 104 and the local store 106.

The local store 106 may contain many files 108. The files may be common files as used in various operating systems or may be any type of storage unit for data or executable code in a computer system. In some cases, the files may be data objects that are manipulated in an application in some form. Throughout this application, an analogy to a computer file with a directory structure may be used to represent various functional concepts such as operating system files, database elements, or other computer manipulable objects, however, the principles may apply to any type of data or executable object. Unless specifically modified, the general term 'file' may refer to any type of computer manipulable object, operating system file, database element, or other item that may be organized and grouped within a computer system.

The files 108 may be organized using a local group definition 110. In an example of a file system, the local group definition 110 may be a file structure that is used by an operating system.

The group definition 110 may include a hierarchical structure, such as a directory structure that may have directory names, subdirectories, and various attributes for each directory. In some embodiments, the group definition 110 may include categories of files 108, groups of files 108, or labels or other metadata that may be applied to files 108.

A file presentation mechanism 112 may use a set of group definitions 114 to present the files 108 in various alternative groups. In some cases, the file presentation mechanism 112 may be an interface within an application that may categorize, group, or otherwise organize the files 108 in different, predefined manners. In other cases, the file presentation mechanism 112 may create an alternate file directory or organization system that may be used in parallel with the local group definition 110 yet the local group definition 110 and the group definitions 114 may reference or link to the same files 108.

Some embodiments may use an operating system based file system to organize the files 108. In such an embodiment, the file presentation mechanism 112, may operate by creating a directory structure according to the group definitions 114 and may create a copy of or link to the files 108. Thus, a user or an application that may use either the local group definitions 110 or the group definitions 114 to locate a particular file.

The group definitions 114 may be disseminated to various devices so that the devices may have a replication of a file organization. A common file organization, especially in systems with large numbers of files and many directories, can facilitate and ease communication between users of different devices. In some cases, applications may use a distributed group definition 114 to traverse a directory structure to locate a particular item or file.

When two or more group definitions are available, many enterprise wide file systems or applications may be operated using both an enterprise wide file structure in some instances as well as a locally customized file system in other instances. For example, a company-wide directive may refer to files in a company-wide group definition, and at the same time the files may be organized into groups at an individual level, a department level, a geographic location level, a functional level, or some other grouping.

The device 116 may be another device similar to device 104 that is connected to the network 102. Device 116 may have a local store 118 that may have a group of files 120 and a local group definition 122. The device 116 may have a file presentation mechanism similar to the file presentation mechanism 112 and may use a set of group definitions 126 that may contain a superset or subset of the group definitions 114 on device 104.

The device 116 may be the same type or different device as device 104. In some cases, the devices 116 and 104 may connect to the network 102 through a direct, hardwired connection, while in other cases, one or more of the devices 104 and 116 may connect to the network 102 through various connections, including wireless, connections through a wide area network, connections through the Internet, or any other network topology.

The device 116 may have a similar set of files 120 as the device 104. In some cases, the files 108 or 120 may contain files that are unique to the local system. Such files may or may not be organized within the group definitions 114 and 126. The files 108 and 120 may contain all of the files that may be defined within the group definitions 114 and 126. In cases where the group definitions 114 and 126 differ, the files 108 and 120 may also differ, and where the group definitions 114 and 126 are the same, the same group of files 108 and 120 may also be shared between the devices 104 and 116.

A server 128 may be connected to the network 102 and may be used to distribute some or all of the files 108 and 120 to the devices 104 and 116, respectively. The server 128 may have a storage system 130 that contains files 132. A file distribution mechanism 134 may be used to distribute the files 132 to the devices 104 and 116.

In some embodiments, the file distribution mechanism 134 may be used to push updated files to the various devices. In a push-type system, the server 128 may transmit the files to the devices, whereas in a pull-type system, the devices may request or download the files. Some embodiments may use various forms of subscription/publication distribution systems.

Some embodiments may use a file distribution system that uses portable media, such as compact disk (CD), digital versatile disk (DVD), tape, or other portable media to transfer a bulk of the files to the various devices. Such embodiments may be used in conjunction with an online server 128. In some such embodiments, a bulk of the data or files may be installed using portable media, with updates and periodic changes being distributed through a server 128.

The device 136 may be connected to the network 102 and may have a group definer application 138, a unique identification generator 140, and a distribution mechanism 142. The device 136 may be used for creating and distributing the group definitions 114 and 126 that may be used by devices 104 and 116, respectively.

The group definer application 138 may be used to create an organization of various files, such as group definitions 114 and 126. In many cases, the organization may be a hierarchical organization that may contain directories with multiple levels of subdirectories. Each directory may have a specific name or other attributes and specific files may be contained in each directory or subdirectory.

When the group definer 138 defines an organization, the unique identification generator 140 may be used to assign a unique identifier to the group definition. The unique identifier may be generated by a globally unique identifier (GUID) or some other mechanism that gives the group definition a unique identification. In many cases, the unique identifier may be a complex series of numbers or letters and the identifier may be generally hidden from view by a user.

The unique identification may be useful when a local group definition uses similar or the same names for a directory or portion of a group structure. The unique identifier may be used by an application that references various group structures of files to determine which group structure is the specific one that is desired.

In many embodiments, a local group definition 110 or 122 may use a similar nomenclature for a local directory structure as may be contained in the group definitions 114 and 126. For example, both a local directory structure and a group definition may use a label "datafiles" for a subdirectory. However, a user or application that may reference the group definitions 114 and 126 may seek the subdirectory "datafiles" and also reference the unique identification to verify that "datafiles" is indeed the correct directory.

In some embodiments, a unique identification may be assigned to an entire group definition. For example, a group definition may define many directories, each containing many files organized in a hierarchy of subdirectories. A single unique identifier may be assigned to the entire group definition. In other embodiments, a different unique identifier may be assigned to each directory or subdirectory.

The group definer 138 may assign various attributes to the directory or organization structure. For example, a group definition may include permission settings for various files, hidden attributes for files, security settings for files, history, or other metadata or attributes.

The device 136 may have a distribution mechanism 142 that may be used for distributing the group definitions 114 and 126 to the various devices. In some embodiments, the device 136 may push updated group definitions 114 and 126 to the devices 104 and 116. A push type distribution system may be one which involves a group definition being affirmatively sent to a recipient device. An example may be an email or other messaging system that may transmit the group definitions 114 and 126.

In other cases, a subscription/publication distribution mechanism may be used. In still other cases, a pull type distribution system may be used. A pull-type distribution system may be one in which the devices 104 and 116 may request an updated group definition 114 or 126. In such an embodiment, one of the devices may periodically query the device 136 or another server or other device and request or pull the updated group definition.

The functionality of the device 136 may be present in a standalone device, such as in embodiment 100, as well as in other devices. For example, the device 104 or 116 may have a group definer, unique identification generator, and distribution mechanism so that an administrator or user of the devices 104 or 116 may create or modify then distribute a group definition.

The files and group definitions may be distributed using different mechanisms and may be distributed separately. In some cases, the files may be distributed initially, then organized and grouped after the group definitions have been transferred to the devices.

In other cases, the group definitions 114 and 126 may be distributed first and files that are defined in the group definitions 114 and 126 but not contained in a local file store may be identified and downloaded or otherwise retrieved.

Figure 2:
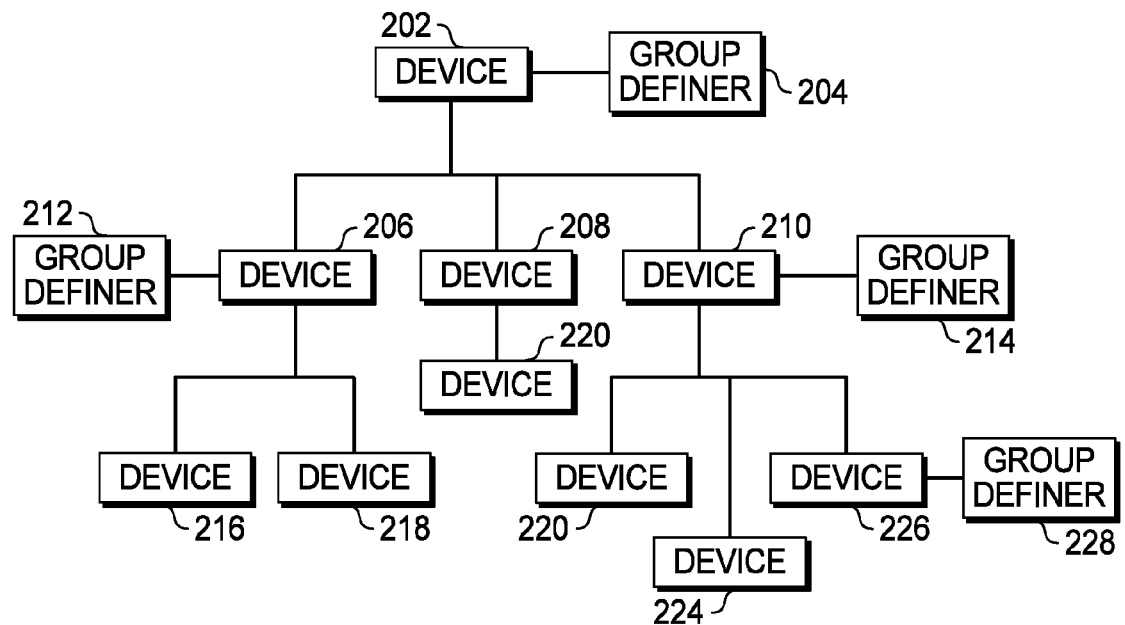
FIG. 2 is a diagram illustration of an embodiment showing a hierarchical network with group definitions.

FIG. 2 is a diagram illustration of an embodiment 200 showing a hierarchical network with group definitions. Embodiment 200 is one example of how a group definition system may be used in a hierarchical network.

The hierarchical network may be a network that is structured in the same manner as a company or other large organization. The network as illustrated in embodiment 200 may be an illustration of a chain of authority and may not reflect the network interconnect topology.

Device 202 may have a group definer 204 and may represent a headquarters operation of a company, with devices 206, 208, and 210 representing division level operations of the company. The device 202 may create a company-wide group definition using the group definer 204 and disseminate the definition to the various devices 206, 208, and 210 for each division of the company. In the embodiment, device 202 may be a parent device with respect to the children devices 206, 208, and 210.

In some cases, a division-level device, such as device 206 and 210, may have group definers 212 and 214 that may be used to create group definitions for use within each division. In the case of device 206, definitions created using the group definer 212 may be passed to devices 216 and 218, along with group definitions from device 202.

Device 208, and its child device 220, may have no group definers and thus may use the group definition from device 202.

Device 210 may have a group definer 214 that may create group definitions that may be used by device 210 as well as devices 222, 224, and 226. Device 226 may have a group definer 228.

In many embodiments, a hierarchical structure such as in embodiment 200 may be a general policy or architecture that may be enforced across an enterprise for convenience and control. By using a hierarchical structure, directives, applications, or other functions that may use a group definition may be passed from a higher level of an enterprise to a lower level with efficiency.

In some hierarchical embodiments, some group definitions may be passed upward or horizontally through the structure. For example, device 226 using group definer 228 may create a group definition that is passed across peer devices within a division such as devices 222 and 224, as well as upward to device 210 and device 202. In some cases, a group definition from device 226 may be passed across the entire organization.

Many hierarchical networks such as embodiment 200 may use various network topologies to interconnect the various devices. In many cases, a network topology may be a 'flat' network with each device connected to a common network backbone. In other cases, an enterprise network may be created with a wide area network backbone connecting several local area networks. The hierarchical structure of embodiment 200 may be a political or authoritative organizational structure and may not correspond with the physical interconnections of the various devices.

Figure 3:
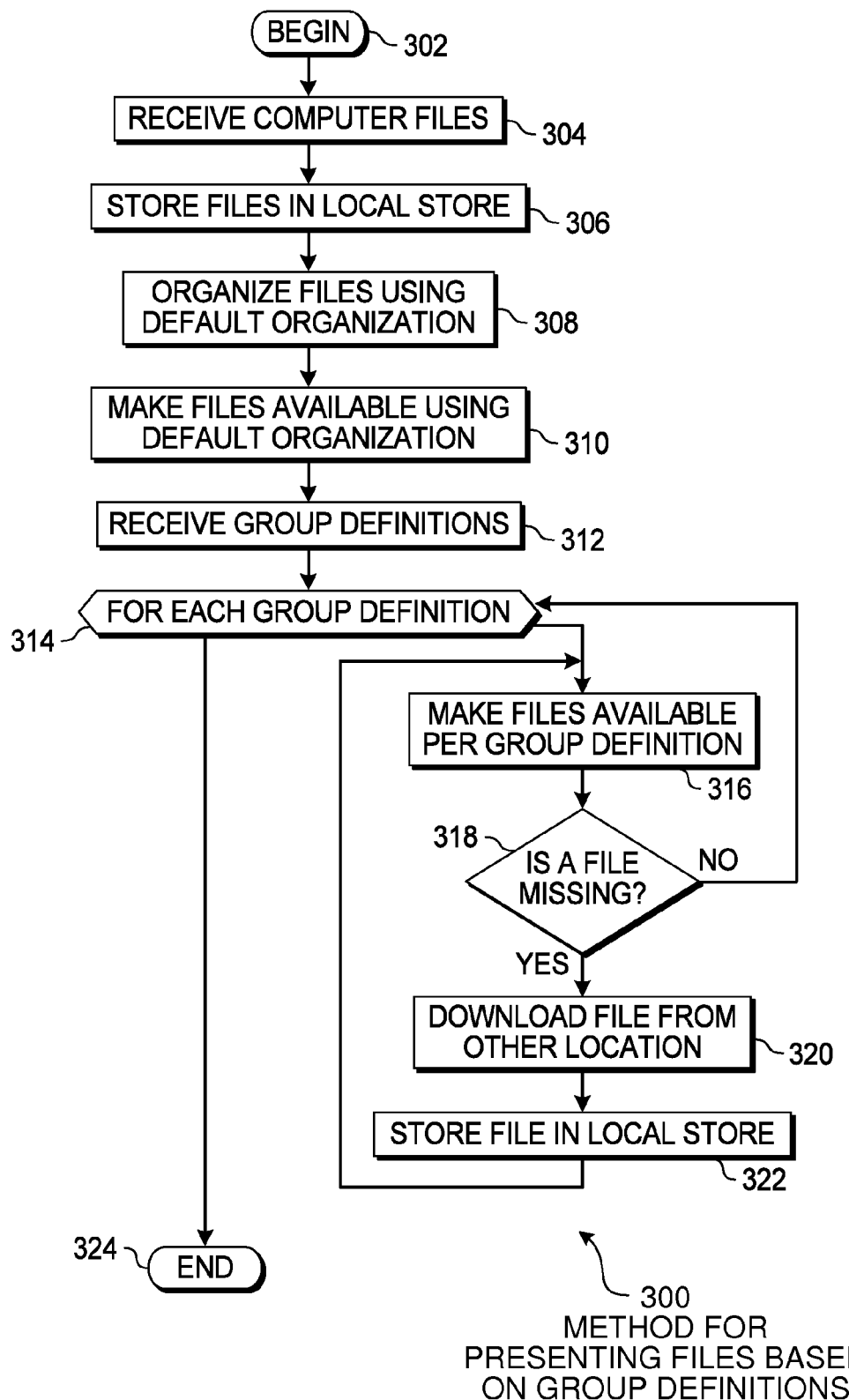
FIG. 3 is a flowchart illustration of an embodiment showing a method for presenting filed based on group definitions.

FIG. 3 is a flowchart illustration of an embodiment 300 showing a method for presenting files based on group definitions. Embodiment 300 is one example of a method that uses group definitions to organize and present files or other items. Other embodiments may use different sequences, additional or fewer steps, different nomenclature, or other terminology to achieve a similar functional result. Embodiment 300 may be the operations of a client device that receives files and a set of grouping definitions, and makes the files available per the grouping definitions.

The process begins in block 302.

Computer files may be received in block 304. In some cases, the files may be received over a network, such as downloading the files in a pull-type arrangement, or when the files are transmitted by a server in a push-type arrangement. In some cases, the files may be distributed using a subscription/publication type distribution arrangement. In some cases, some of the files may be installed using CD or DVD or other media.

The files may be stored in a local store in block 306. The local store may be any storage device or facility that may be under the control of a device. In some cases, the local store may be a hard disk or other storage media that is physically connected to a system. In other cases, the local store may be remotely connected, such as a storage area network, a storage system accessible over a network, or a storage system accessed over the Internet.

The files may be organized in a default organization in block 308. In many cases, the files may be installed into a defined directory structure with named directories and subdirectories. In other cases, the files may be stored in a single large repository with little or no organization imposed on the files.

The files referred to in embodiment 300 and elsewhere in this specification may be any electronic data or executable object that may be stored in a data storage system. In many embodiments, the files may be conventional files as used in various operating systems for storing data and executable items. In other embodiments, the files may be data objects such as those found in a database or accessed using specialized application software.

The files may be made available using a default organization in block 310. In some embodiments, the files may have a locally defined organization, such as a default organization that may be established when the files are loaded.

The group definitions may be received in block 312. In some embodiments, the group definitions may be received using a different mechanism than the files and may be applied to the files after the files are received. For example, the files may be downloaded individually into a central repository using FTP or some other file transfer mechanism, while the group definitions may be transferred using a messaging system such as a subscription/publication system or other messaging system. Various embodiments may use different mechanisms for transferring files and group definitions, which may include packaging, zipping, consolidating, or other pre-transfer and post-transfer operations.

For each group definition in block 314, the files may be made available per the group definition in block 316. Various embodiments may have different mechanisms that may be used to make files available according to a group definition.

In an example of an embodiment where the files are operating system files, a directory structure may be created according to a group definition and links may be created within the directory structure to each of the local files according to the group definition. In some similar embodiments, a local version of a file may be copied into the directory structure defined by the group definition. In such an embodiment, two copies of a file may be present: one in a locally created group definition and a second in a group definition received in block 312.

In an example of an embodiment where the files are accessed through an application, the files may be presented using a filter created from the group definitions. Such a filter may include a structured organization of the files and may apply a naming convention to the organization as well as properties for each of the files.

If a file is missing from the group definition in block 318, the file may be downloaded from another location in block 320 and stored in a local store in block 322. The group definition may be applied again in block 316 using the updated group of files.

In some embodiments, the group definitions may include specific files by name and in some cases may include version identifiers, checksums, or other identifiers. When a newer file is defined in the group definition from the locally available file, an updated version of the file may be downloaded and used within the organization of files.

Figure 4:
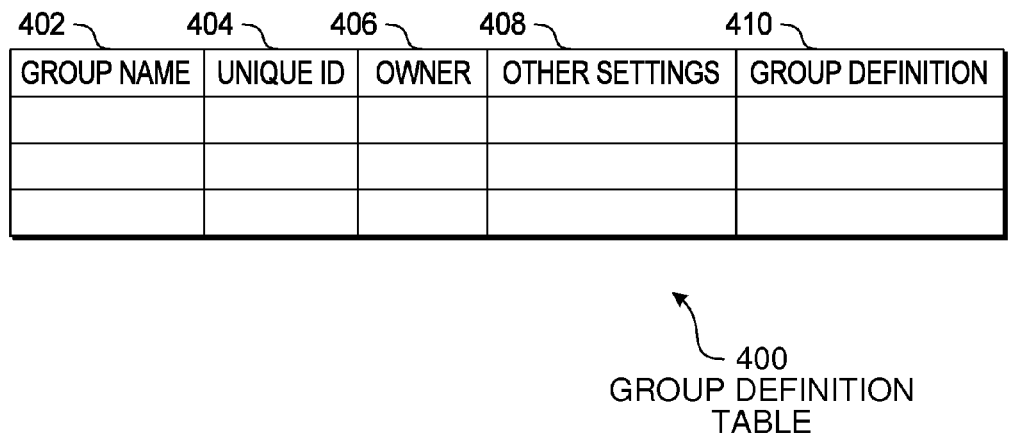
FIG. 4 is a diagram illustration of an embodiment showing a group definition table.

FIG. 4 is a diagram illustration of an embodiment 400 showing a group definition table. Embodiment 400 is one example of a table that may be used to define multiple group definitions.

The table of embodiment 400 has headings comprising a group name 402, a unique identifier 404, an owner 406, other settings 408, and a group definition 410. Each row of the table may be populated with a separate group definition.

The group name 402 and unique identifier 404 may be a text name for the group and a unique identifier such as a GUID for the group. In many cases, the text name may be referenced by a human when interacting with the group, while the unique identifier may be used with or without the text name when a computer application interfaces with the group.

The owner 406 may be the originator of the group. In some embodiments, the owner may be the administrator who created the group. In some embodiments, the owner may be the department or organization responsible for the group. Some embodiments may permit only the owner to make changes to the group, while other embodiments may permit users with the appropriate permissions to make changes to the group.

Various settings 408 may be defined with a group. Examples of such settings may include permission sessions for reading, writing, performing various operations on the group, or other permission settings. Some settings may include restrictions on how the group may be transferred to other devices, which applications may interact with the group, or any other restrictions. Other embodiments may include any type of variables or settings.

The group definition 410 may be a pointer to a group definition or may include the group definition itself. Each embodiment may use different techniques, protocols, definitions, or other mechanisms to define a group and a group hierarchy. Some embodiments may use a hierarchical, multilevel group definition, while other embodiments may use a single-level categorization or grouping of files.

Figure 5:
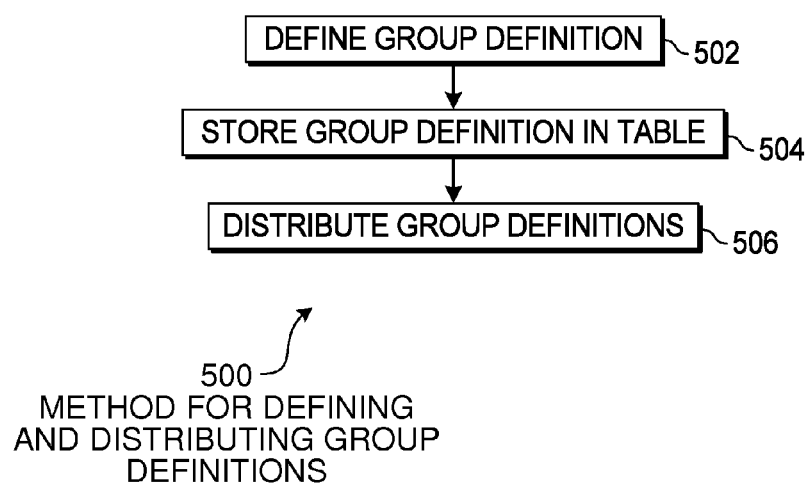
FIG. 5 is a diagram illustration of an embodiment showing a method for defining and distributing group definitions.

FIG. 5 is a flowchart illustration of an embodiment 500 showing a method for defining and distributing group definitions. Embodiment 500 is an overview flowchart of a sequence. Some embodiments may have different methods or techniques for performing the functions described in embodiment 500.

A group may be defined in block 502. Different embodiments may have different mechanisms for defining a group. In some cases, a graphical user interface may be used to select, drag, and drop files into various groups. In other cases, a text editor may be used to define the groups and their contents. In still other cases, an automated tool may create and populate groups based on a defined logic or algorithm.

After creating a group, the group definition may be stored in the group definition table in block 504. The group may be entered as a row in a table similar to embodiment 400, or may have some other definition mechanism.

The group definitions may be distributed in block 506. Various embodiments may use different techniques for distributing the group definitions. In embodiment 500, several groups may be combined into a table and the table may be distributed to various systems that may use the table to arrange filed according to the groups. In other embodiments, each group definition may be separately transferred to a system that may use the groups.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system including a processor, the computer system under the control of an organization, the organization including a plurality of functional groups, the computer system included in a functional group, the functional group selected from among the plurality of functional groups, the computer system connected to a network along with a remote computer system, a method for grouping computer files at the computer system the method comprising:

receiving an organization wide group definition over a network connection, the organization wide group definition having been defined on the remote computer system, the organization wide group definition defining how files are to be grouped within the organization, the organization wide group definition having a unique identifier used to distinguish nomenclature of the organization wide group definition from nomenclatures of other group definitions;

accessing a further group definition applicable the functional group, the further group definition defining how to files are to grouped within the functional group, the further group definition differing from the organization wide group definition, the further group definition having a further unique identifier used to distinguish nomenclature of the further group definition from nomenclatures of other group definitions, including the organization wide group definition the processor presenting links to a plurality of computer files in alternate groups in parallel with one another such that each of the plurality of computer files can be accessed using any of the alternate groups, including:

formulating a group of links to the plurality of computer files in accordance with the organization wide group definition, including associating the group of links with the unique identifier;

formulating a further different group of links to the plurality of computer files in accordance with the further group definition, including associating the group of links with the further unique identifier; and presenting both the group of links and the further different group of links at the computer system to provide access to the plurality of computer files receiving a reference to subdirectory label, the reference including a reference unique identifier;

determining that the subdirectory label is included in both the group of links and the further group of links; and comparing the reference unique identifier to the unique identifier and the further unique identifier to determine if the reference refers to the subdirectory label in the organization wide group definition or if the reference refers to the subdirectory label in the further group definition.

2. The method of claim 1, wherein the organization wide group definition and the further group definition are included in a table.

3. The method of claim 2, wherein the organization wide group definition and the further group definition are defined by different owners.

4. The method of claim 1, further comprising receiving the plurality of computer files through a first distribution mechanism and receiving organization wide group definition through a second different distribution mechanism.

5. The method of claim 1, wherein the further group definition is used to present the plurality of computer files based on a user selection.

6. The method of claim 5, wherein the further group definition organizes the plurality of computer files by category.

7. The method of claim 1, wherein the organization wide group definition is received from a parent device in a hierarchical structure.

8. The method of claim 1 further comprising:
determining that the organization wide group definition contains a file not stored locally at the computer system;
retrieving the file;
storing the file locally at the computer system; and
presenting the file along with the plurality of computer files using both the organization wide group definition and the further group definition.

9. The method of claim 1, wherein presenting the group of links and the further different group of links at the computer system to provide access to the plurality of computer files comprises presenting the group of links and the further different group of links at the computer system so as to provide write access directly to the plurality of computer files through both the organization wide group definition and the further group definition.

10. A system comprising:
a processor;
system memory;
a local store;
a network connection;
a plurality of computer files stored at the local store;
an organization wide group definition for an organization, the organization wide group definition having been defined on the remote computer system, the organization wide group definition defining how files are to be grouped within the organization, the organization wide group definition having a unique identifier used to distinguish nomenclature of the organization wide group definition from nomenclatures of other group definitions;
a further group definition applicable to a functional group of the organization, the further group definition defining how to files are to be grouped within the functional group, the further group definition differing from the organization wide group definition, the further group definition having a further unique identifier used to distinguish nomenclature of the further group definition from nomenclatures of other group definitions, including the organization wide group definition;
one or more computer storage devices having stored thereon computer-executable instructions representing a presentation module, the presentation module configured to:
present links to the plurality of computer files in alternate groups in parallel with one another such that each of the plurality of computer files can be accessed using any of the alternate groups, including:
formulate a group of links to the plurality of computer files in accordance with the organization wide group definition, including associating the group of links with the unique identifier;
formulate a further different group of links to the plurality of computer files in accordance with the further group definition, including associating the group of links with the further unique identifier; and
present both the group of links and the further different group of links at the computer system to provide access to the plurality of computer files;
wherein the presentation module is further configured to:
receive a reference to subdirectory label, the reference including a reference unique identifier;
determine that both the group of links and the further group of links include the subdirectory label; and
compare the reference unique identifier to the unique identifier and the further unique identifier to determine if the reference refers to the sub directory label in the organization wide group definition or if the reference refers to the subdirectory label in the further group definition.

11. The system of claim 10, wherein the organization wide group definition and the further group definition are included in a table.

12. The system of claim 11, wherein the organization wide group definition and the further group definition are defined by different owners.

13. The system of claim 11 further comprising:
a first distribution mechanism adapted to receive the plurality of computer files; and
a second distribution mechanism adapted to receive the table.

14. The system of claim 13, wherein the first distribution mechanism is a pull mechanism; and
wherein the second distribution mechanism is a push mechanism.

15. The system of claim 10, wherein the presentation module configured to present both the group of links and the further different group of links at the computer system to provide access to the plurality of computer files comprises the presentation module being configured to present the group of links and the further different group of links at the computer system so as to provide write access directly to the plurality of computer files through both the organization wide group definition and the further group definition.

16. A nonvolatile computer storage device having there-on a computer program product for use at a computer system, the computer system under the control of an organization, the organization including a plurality of functional groups, the computer system included a functional group, the functional group selected from among the plurality of functional groups, the computer system connected to a network along with a remote computer system, the computer program product comprising instruction that when executed at a processor, cause the computer to perform a method including the following:
receive an organization wide group definition over a network connection, the organization wide group definition having been defined on the remote computer system, the organization wide group definition defining how files are to be grouped within the organization, the organization wide group definition having a unique identifier used to distinguish nomenclature of the organization wide group definition from nomenclatures of other group definitions;
access a further group definition applicable the functional group, the further group definition defining how to files are to grouped within the functional group, the further group definition differing from the organization wide group definition, the further group definition having a further unique identifier used to distinguish nomenclature of the further group definition from nomenclatures of other group definitions, including the organization wide group definition;

present links to a plurality of computer files in alternate groups in parallel with one another such that each of the plurality of computer files can be accessed using any of the alternate groups, including:
formulate a group of links to the plurality of computer files in accordance with the organization wide group definition, including associating the group of links with the unique identifier;
formulate a further different group of links to the plurality of computer files in accordance with the further group definition, including associating the group of links with the further unique identifier; and
present both the group of links and the further different group of links at the computer system to provide access to the plurality of computer files;
receive a reference to subdirectory label, the reference including a reference unique identifier;
determine the subdirectory label is included in both the group of links and the further group of links; and
compare the reference unique identifier to the unique identifier and the further unique identifier to determine if the reference refers to the subdirectory label in the organization wide group definition or if the reference refers to the subdirectory label in the further group definition.

17. The computer program product of claim 16, wherein computer-executable instructions that, when executed, cause the computer system to present both the group of links and the further different group of links at the computer system to provide access to the plurality of computer files comprise computer-executable instructions that, when executed, cause the computer system to present the group of links and the further different group of links at the computer system so as to provide write access directly to the plurality of computer files through both the organization wide group definition and the further group definition.

* * * * *